United States Patent [19]
Leliaert et al.

[11] 3,934,373
[45] Jan. 27, 1976

[54] PORTABLE SURFACE TREATING APPARATUS

[75] Inventors: Raymond M. Leliaert, South Bend; Clyde A. Snyder, Mishawaka, both of Ind.

[73] Assignee: Wheelabrator-Frye, Inc., Mishawaka, Ind.

[22] Filed: Aug. 16, 1974

[21] Appl. No.: 497,885

[52] U.S. Cl. .................. 51/9 M; 51/270; 51/273
[51] Int. Cl.² .................. B24C 3/06; B24C 9/00
[58] Field of Search ....... 51/8 R, 9 R, 9 M, 14, 270, 51/273, 262 R, 258; 15/340, 345–346, 1; 209/215, 218, 219, 223, 223 A; 404/75, 94

[56] References Cited
UNITED STATES PATENTS

| | | | |
|---|---|---|---|
| 1,326,561 | 12/1919 | Ady | 209/223 A |
| 2,064,344 | 12/1936 | Good | 15/345 X |
| 2,677,461 | 5/1954 | Bodey | 209/215 |
| 3,004,279 | 10/1961 | Ringer | 15/346 X |
| 3,007,191 | 11/1961 | Braun | 15/346 X |
| 3,262,228 | 7/1966 | Schenck | 51/9 M |
| 3,380,196 | 4/1968 | Mabille | 51/9 M |
| 3,448,544 | 6/1969 | Cardon | 51/8 R |
| 3,691,689 | 9/1972 | Goff | 51/9 M |
| 3,742,650 | 7/1973 | Graf | 51/9 R |
| 3,769,752 | 11/1973 | McDonald | 51/14 |

*Primary Examiner*—Donald G. Kelly
*Attorney, Agent, or Firm*—McDougall, Hersh & Scott

[57] ABSTRACT

A portable apparatus for surface treatment with particulate material thrown onto the surface at high velocity is disclosed. The apparatus includes a device or features for removing from the surface the particulate material and debris generated by the treating process. The removing features include a magnetic drum for attracting ferromagnetic material, a vacuum packup for removing nonmagnetic material, and a plurality of air jets for positioning and lifting the material to increase the efficiency of the recovery process. The recovered material is separated according to content and the particulate is recycled for reuse.

13 Claims, 3 Drawing Figures

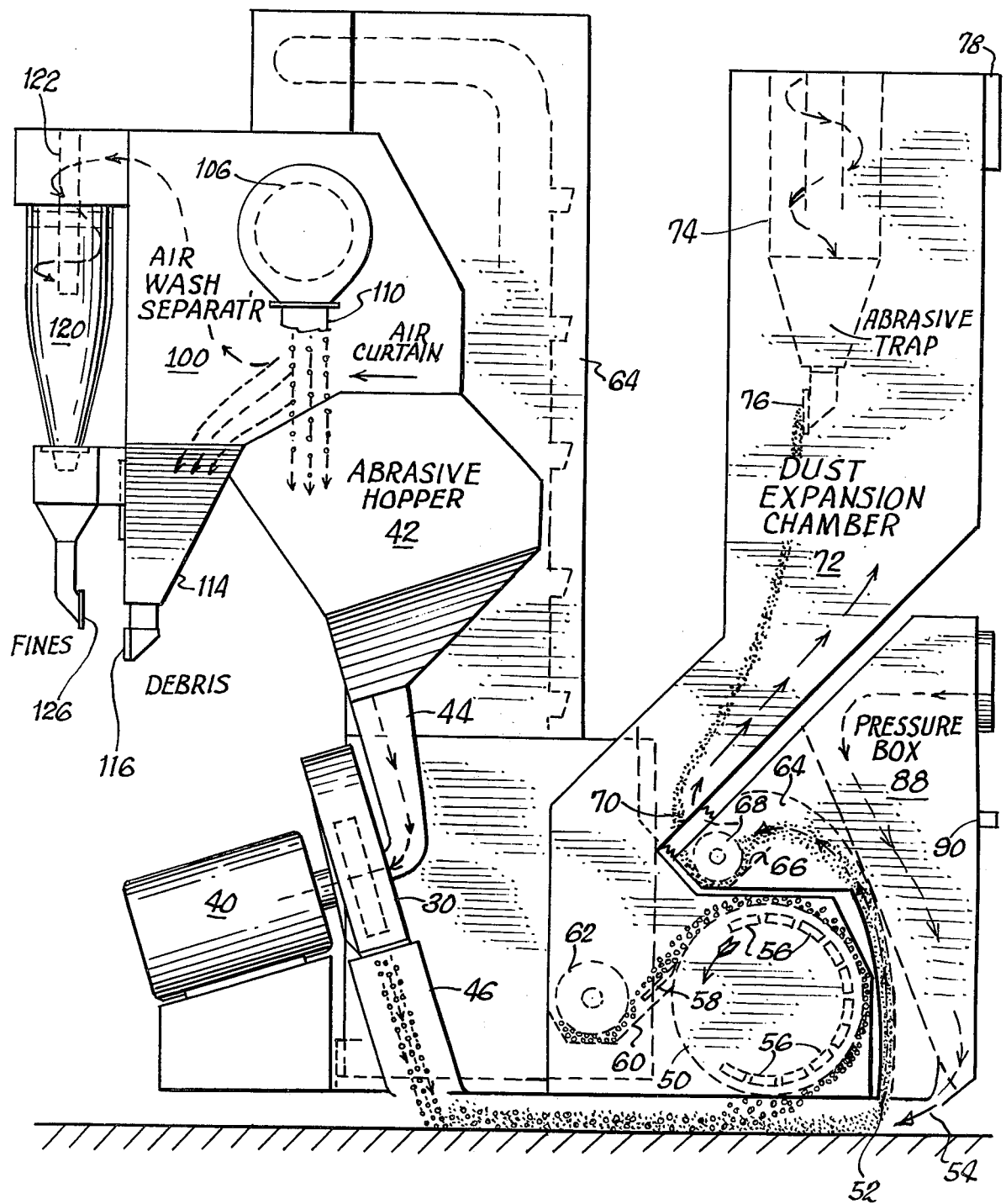

PORTABLE SURFACE TREATING APPARATUS

BACKGROUND OF THE INVENTION

This invention relates to a portable apparatus for surface treatment with particulate material projected at high velocity onto the surface. More particularly, it relates to a portable self-contained device including means for the removal of particulate material, dust, rubber and other debris from a vehicular surface such as a highway or airplane runway. Such surface treatment is effective for cleaning the vehicular surface and otherwise restoring vehicle traction characteristics thereon.

In U.S. Pat. No. 3,691,689, description is made of a mobile apparatus for cleaning surfaces with a particulate abrasive material wherein the abrasive particles are thrown centrifugally at high velocity downwardly through the open bottom side of a housing enclosing an exposed surface to be cleaned. The particulate material thrown onto the surface at a high velocity is prevented from ricocheting into the atmosphere by an apron of resilient material which reaches down to the surface. The spent particulate material and dust pass under the apron for subsequent removal from the surface by a rotating brush. The brush sweeps the particulate material and dust into an elevator which raises the dust and particulate material to a separator whereby the particulate material is separated from the dust and returned for recycling by the throwing wheel.

The brush pickup of the above referenced patent represents an extra piece of equipment which materially increases the size of the machine and cost of operation. Further, the brushes require frequent replacement and do not accomplish a fully satisfactory recovery of the particulate and debris. This is particularly true when operating over a rough, uneven or grooved surface.

Another method of surface treatment is disclosed in U.S. patent application Ser. No. 363,723 filed May 24, 1973 now U.S. Pat. No. 3,877,175, issued Apr. 15, 1975, and assigned to the present assignee. There a vacuum type recovery system is employed wherein jets of air are directed towards the surface to focus and elevate spent abrasive and debris towards a vacuum inlet wherein a suction force is effective for picking up the debris and abrasive. While this technique is more efficient than disclosed in the referenced patent, it is incapable of effective removal of abrasive trapped in cracks or grooves in a vehicular surface. This is a particularly troublesome problem in the case of airport runways which are often systematically grooved to increase the coefficient of friction of the surface and to improve its water runoff capabilities. If the equipment is not capable of adequately removing abrasive from a grooved pavement, there is a slow but perceptible buildup of such material in the grooves, reducing traction and water runoff.

In U.S. patent application Ser. No. 432,353, filed Jan. 10, 1974, now U.S. Pat. No. 3,858,359, issued Jan. 7, 1975, and also assigned to the present assignee, there is disclosed a third type of mobile surface treating apparatus wherein the recovery means employed is magnetic. In this apparatus the abrasive thrown onto the surface is ferromagnetic as, for example, steel shot or grit. The shot or grit is recovered by use of a magnetic drum positioned rearwardly of the throwing wheel sufficiently close to the surface that the abrasive is attracted thereto. After pickup the abrasive is conveyed to a belt and bucket elevator for subsequent cleaning and reuse. This technique provides a high recovery rate of abrasive regardless of whether the abrasive is on a flat surface or in cracks or grooves on said surface. However, it can remove only ferromagnetic material and leaves much dust, rubber and other nonmagnetic debris in place. Accordingly, it is again necessary to provide additional cleaning equipment to insure complete removal of the nonmagnetic debris.

Other methods of particulate pickup utilizing magnetic or vacuum means or which employ rebound techniques are described in the following U.S. Pat. Nos. 3,380,196 (Mabille); 2,064,344 (Good); 3,004,279 (Ringer); 3,034,262 (Paulson); and 3,448,544 (Cardone).

Accordingly, it is an object of the present invention to provide a portable surface treating apparatus which is capable of substantially completely removing both magnetic and nonmagnetic debris from a road surface whether grooved or flat.

It is another object of the present invention to provide a portable surface treating apparatus capable of recovering all debris and particulate from a surface.

It is a further object of the present invention to provide a portable surface treating apparatus capable of removing debris from grooved and cracked surfaces.

It is still another object of the present invention to provide a portable surface treating apparatus capable of continuous operation over a substantial period of time.

It is yet another object of the present invention to provide a portable surface treating apparatus which achieves economy of operation by recovery and reuse of abrasive.

It is a further object of the present invention to provide a portable surface treating apparatus capable of off-loading debris to a dumping vehicle to minimize downtime.

Other objects and advantages of the invention will be apparent from the concluding portion of the specification.

BRIEF DESCRIPTION OF THE DRAWINGS

FIG. 3 is an enlarged side view having portions cut away illustrating in greater detail the essential components of the present invention.

DETAILED DESCRIPTION

Figure 1:
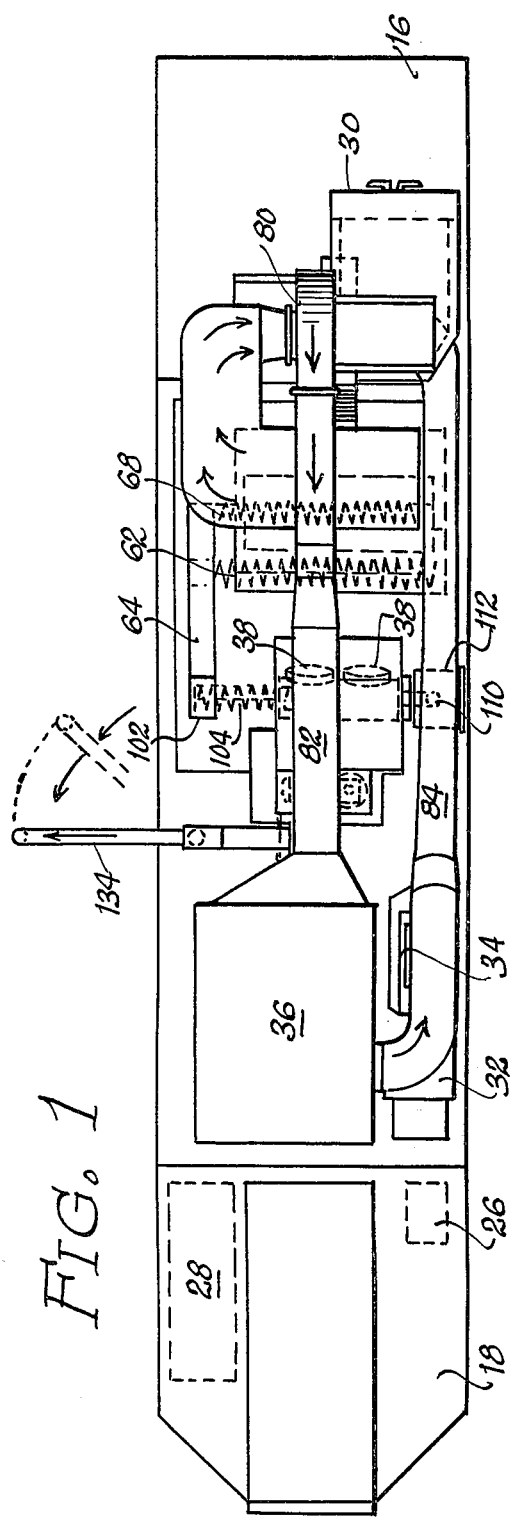
FIG. 1 is a plan view of the portable surface treating apparatus according to the present invention.
Figure 2:
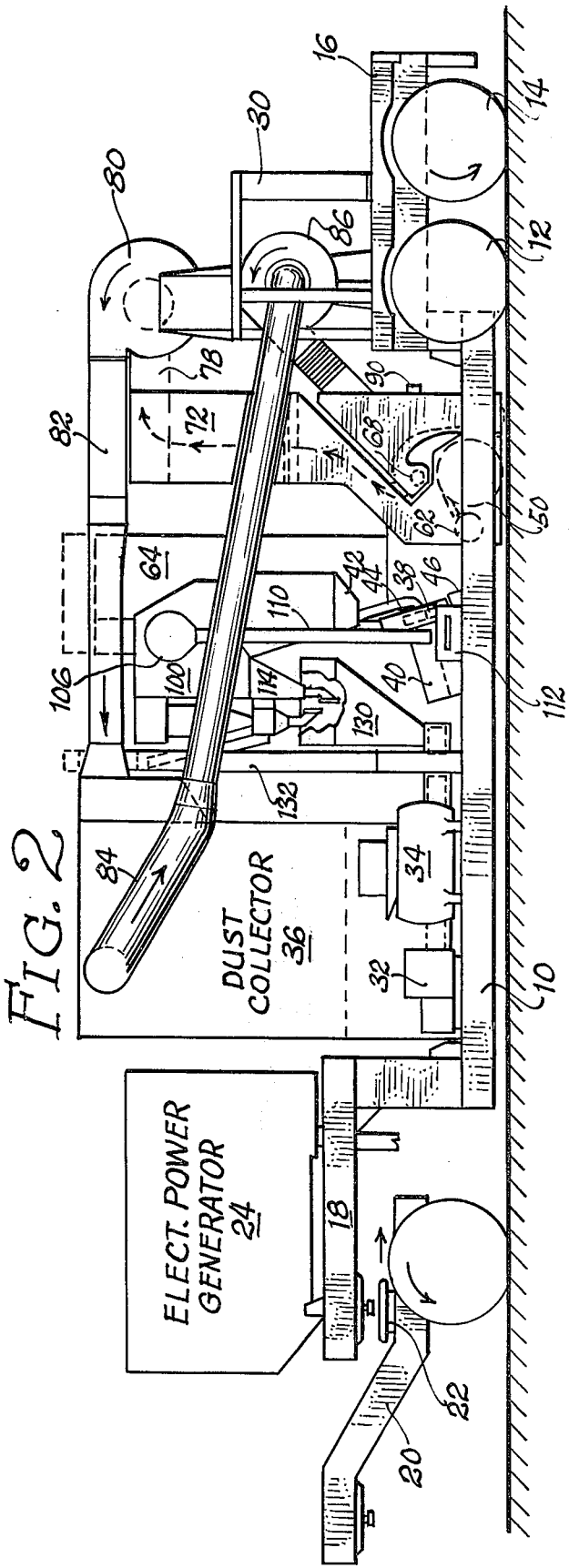
FIG. 2 is a side view having portions cut away illustrating the present invention.

Referring now to FIGS. 1 and 2, a preferred embodiment of the invention is shown. The treating apparatus is mounted on a trailer frame 10 having wheels 12, 14 mounted to the rear end 16 thereof. A front end 18 of the frame 10 is adapted to receive a standard truck trailer hitch assembly 20 having a fifth wheel mounting 22 thereon. In turn, the assembly 20 is attached to a tractor or other suitable towing device (not shown) in a known manner. Alternately, of course, the present invention may be self-propelled rendering unnecessary the trailer hitch assembly.

A power generator 24 and fuel tank 26, 28 are provided on front end 18 while the rear end 16 has a control and switching panel 30 mounted thereon. Other support equipment shown but not essential to an understanding of the present invention includes power genarator 32 and compressor 34 associated with a dust collector 36 to be described subsequently.

Mounted to the main support frame 10 is at least one airless centrifugal particulate throwing wheel 38 powered by a motor 40 (FIG. 3). The throwing wheels are preferably of the type manufactured by Wheelabrator-Frye Inc. of Mishawaka, Ind. In the embodiment shown two such wheels are shown mounted to the frame 10. Particulate material such as steel shot, grit or other abrasive material is supplied to the wheel from a hopper 42 via a hose 44. The particulate is supplied to the center of the wheel which is rotating at a high angular velocity. The blades of the wheel throw the particulate material outwardly therefrom in a pattern determined by the wheel configuration and the shape of a protective housing 46. Accordingly, as illustrated in FIG. 3, the abrasive is thrown downwardly at a fixed rearward angle onto the road surface. As described in the above cited copending applications, the abrasive blast is effective for dislodging surface deposits of rubber due to vehicle tires, petroleum deposits, etc. The abrasive blast bombards the deposits with abrasive particles of sufficiently high kinetic energy that they exceed the bonding strength between the deposits and the road surface. Generally the deposits are broken up into small fragments which, along with the spent abrasive, are left on the surface as the apparatus moves therealong.

In order to provide an economical and rapid surface treatment, it is necessary that the present apparatus be capable of a substantially continuous operation. It is necessary, therefore, that the spent abrasive be recovered for reuse. Absent this capability, it would be necessary to continually stop the machine and reload it with additional abrasive. Further, as was pointed out earlier, without the capability for effectively removing the debris generated by the treating process, additional pieces of equipment, time and money would be required to produce a clean and safe vehicular surface.

Accordingly, recovery means are mounted on the frame 10 rearwardly of the throwing wheel blast patterns. The recovery means (FIG. 3) is a compound system including a magnetic drum 50 consisting of a nonmagnetic housing containing magnetic means for attracting ferromagnetic particulate and debris and a vacuum orifice 52 for removing the nonmagnetic debris as well as any abrasive which is not picked up by the magnetic drum 50. In order to enhance the pickup ability of both the drum 50 and the suction orifice 52, an air blast is provided through at least one opening 54 positioned rearwardly of the orifice 52. This air blast is directed forwardly and downwardly against the surface in a manner so as to concentrate the particulate and debris into the pickup areas of the drum and suction orifice. Further, it tends to slightly elevate the material off the surface to improve the removal capability of the recovery system.

MAGNETIC PICKUP

Referring first to the drum 50, several arrangements according to the present invention are possible. A preferred arrangement employs a plurality of fixed magnets 56 located at fixed positions on the inside circumference of the drum which is itself formed of nonmagnetic material such as stainless steel. The drum is rotated counterclockwise as viewed in FIG. 3 and thus as the drum encounters magnetic material on the surface under treatment, the magnets inside the drum attract the material to the outside circumference of the drum. The material is then carried on the drum to a point where no magnets are positioned. At this point the material is free to fall away from the circumference of the drum. Any material which fails to do so may be forcibly removed therefrom by a scraper blade 58. The material so recovered drops into a collection trough 60 from which it is conveyed by a screw conveyor 62 to a belt and bucket-type elevator 64.

VACUUM PICKUP

The operation of the vacuum orifice 52 will be next considered. Debris and any remaining particulate not removed by the drum is sucked in through the orifice 52 and passes upwardly to a first expansion chamber 64 where a drop in the air velocity occurs. This permits coarse material picked up by the suction orifice to settle out into a trough 66 from which it is conveyed by a screw conveyor 68 to the belt and bucket elevator 64. The air and any fine material which remains suspended passes through an opening 70 to a second expansion chamber 72. In the chamber 72 there is again a reduction in the air velocity permitting additional settling out of suspended material which also falls into the trough 66. An inertial-type separator 74 of known construction is employed in the expansion chamber 72 to trap and remove any remaining particulate. A dribble valve 76 permits the accumulated abrasive to periodically be released without loss of pressure.

From the inertial separator 74, the air passes via an outlet 78 to a motor driven suction fan 80 (FIG. 2). This fan is utilized to produce the vacuum or suction force at the orifice 52 and exhausts the air via duct 82 to the dust collector 36. The dust collector 36 is of a known construction and need not be described here in detail. By means of a plurality of filter elements the dust and fine particles suspended in the air received from the duct 82 are removed. The filtered air is then exhausted from the dust collector 36 via duct 84 and, if desired, is reused in a manner now to be described.

Duct 84 conducts the filtered air to the inlet of a second fan 86 employed as a blower fan to produce the air blast for outlet 54 (FIG. 3). The blower 86 pressurizes a pressure box 88 for producing the air blast from outlet 54. In practice it has been found that not all of the air filtered by the dust collector 36 is necessary for producing the air blast. Accordingly, an adjustable bleeder valve 90 is provided communicating the interior of the pressure box with the atmosphere to expelled excess air.

To summarize, by means of a magnetic drum and vacuum recovery system, the debris and particulate laying in the surface of the road are recovered. The air utilized in the vacuum system is treated and filtered to remove particulate debris, and then is reused to produce the air blast for elevating and focusing the debris and particulate for pickup.

ABRASIVE RECOVERY

It will be recalled that both screw conveyors 62 and 68 convey the recovered debris and particulate to the boot of the belt and bucket elevator 64. As indicated schematically in FIG. 3, the elevator 64 is effective for carrying the material upwardly to the inlet of an air wash separator 100. The material is conveyed from a head spout 102 (FIG. 1) by a screw conveyor 104 through a rotating trash screen 106 (FIG. 3). The trash screen 106 is effective for permitting only particulate and small debris to pass through it into the air wash separator proper. The remaining debris such as chunks of rubber, nails and other trash are fed into conduit 110 for deposit in a trash receptacle 112 mounted to the frame 10.

The granular material composed of small debris and abrasive passes through the trash screen into the air wash separator. As is well known in the art, an air wash separator utilizes a curtain of air passing across a falling width of particulate material to separating the material according to density. Thus, lighter particulate material is horizontally displaced from its vertically downward fall path by a greater distance than heavier particulate material. Since the abrasive, such as steel shot or grit is very heavy relative to the debris, the hopper 42 receives only abrasive since the steel shot or grit is affected little by the air curtain.

The debris which is of lighter density is received in a second receptacle 114. Generally this material will be a mixture of sand, rubber, and hydrocarbon deposits picked up by the apparatus. A dribble valve 116 permits the periodic deposit of the accumulated debris into a larger receptacle 130 (FIG. 2) without affecting the air flow in the air wash separator. Prior to exhausting the air from the air wash separator, it is desirable to minimize dust and pollution by employing a cyclone separator 120 for removing fine sand and dust from the air flow. The air passes in a spiral manner downward through the separator 120 and up and out through pipe 122. The suspended materials precipitate out in the process. A dribble valve 126 is provided for the same purpose as valve 116.

If required to effect a desired degree of separation, multiple stage air wash separators can be employed. Such devices merely repeat the air wash several times to improve the priority of the separated materials.

As shown in FIG. 2, the sand, rubber and fines which are collected through the air wash separating process are subsequently deposited in a container 130. Periodically it is necessary to empty the container 130 and the dust collector 36, and for this purpose there is provided an off-loading elevator 132 receiving the contents of the dust collector 36 and container 130 at its boot. At the top of elevator 132 is a swingable boom member 134 (FIG. 1) which is suitable for conveying the sand and fines from the top of the elevator to a dump truck or other vehicle for removal. In this manner the present invention can be kept operating on the vehicular surface without the need for interrupting treatment every time the accumulated debris fills the storage container 130. Instead, the contents of the container are merely offloaded onto another vehicle and then surface treatment may resume.

While we have shown and described an embodiment of this invention in some detail, it will be understood that this description and illustrations are offered merely by way of example, and that the invention is to be limited in scope only by the appended claims.

We claim:

1. In a portable apparatus having means for projecting particulate material onto a surface portions of which may be grooved and for removal of debris and spent particulate thereon, the improvement comprising:
   a. magnetic means for removing ferromagnetic material from said surface;
   b. second means for removing by vacuum pickup any remaining debris and particulate from said surface;
   c. separating means receiving the removed material from said first and second means for effecting separation of debris from said particulate;
   d. means for returning the recovered and separated particulate to said projecting means; and
   e. means for producing an air blast on said surface to focus the debris and spent particulate into the vicinity of said magnetic means and second means.

2. The apparatus according to claim 1 wherein said means for producing an air blast includes:
   a closed box;
   means for pressurizing said box above atmospheric pressure;
   at least one discharge opening communicating between the box and the atmosphere adjacent said surface and positioned to effect said focusing.

3. The apparatus according to claim 2 wherein the means for pressurizing is a blower fan connected to receive exhaust air from said second means.

4. The apparatus of claim 1 wherein said magnetic means includes a rotating drum.

5. The apparatus of claim 1 wherein said second means includes:
   a closed chamber;
   means for producing a partial vacuum in said chamber; and
   at least one orifice communicating between the chamber and the atmosphere adjacent said surface for vacuum pickup of debris.

6. The apparatus according to claim 5 wherein the means for producing said partial vacuum is a suction fan.

7. The apparatus of claim 1 further including means for settling out the airborne material picked up by said second means wherein said means for settling out includes at least one air expansion chamber and an inertia separator.

8. The apparatus of claim 1 wherein said separating means includes:
   a trash screen receiving said removed material for screening out large debris therefrom; and
   at least a one-stage air wash separator for effecting separation of the remaining removed material according to density.

9. The apparatus according to claim 8 wherein said separating means further includes conveyor means for transporting the removed material from said first and second means to said trash screen.

10. The apparatus according to claim 9 wherein said conveyor means include at least one screw conveyor and a belt and bucket elevator.

11. The apparatus according to claim 8 wherein said separating means also includes a cyclone separator.

12. A portable device for removal of debris from a horizontal surface including means for projecting ferromagnetic abrasive onto said surface comprising:
   magnetic means for removing ferromagnetic debris from said surface;
   vacuum means for removing nonmagnetic debris from said surface;
   means receiving the ferromagnetic and nonmagnetic debris for reclaiming said abrasive therefrom;
   means returning said reclaimed abrasive to said projecting means for reuse; and
   means for producing an air blast on said surface to focus the ferromagnetic and nonmagnetic debris and spent abrasive into the vicinity of said magnetic means and vacuum means.

13. In a portable apparatus having means for projecting particulate material onto a surface, portions of which may be grooved, and for removal of debris and spent particulate thereon, the improvement comprising:

a. magnetic means for removing ferromagnetic material from said surface including a nonmagnetic rotating drum and magnets at selected fixed positions along the inner circumference of said drum;

b. second means for removing by vacuum pickup any remaining debris and particulate from said surface;

c. separating means receiving the removed material from said first and second means for effecting separation of debris from said particulate; and d. means for returning the recovered and separated particulate to said projecting means.

\* \* \* \* \*